UNITED STATES PATENT OFFICE.

M ALEXANDER WILLOUGHBY, OF DETROIT, MICHIGAN.

INTERNAL-COMBUSTION-ENGINE-CYLINDER-SOLDERING METAL COMPOSITION.

1,355,202.  Specification of Letters Patent.  Patented Oct. 12, 1920.

No Drawing. Application filed February 24, 1919, Serial No. 278,833. Renewed February 25, 1920. Serial No. 361,301.

*To all whom it may concern:*

Be it known that I, M ALEXANDER WILLOUGHBY, a citizen of the United States, residing at Detroit, in the county of Wayne and State of Michigan, have invented a new and useful Internal-Combustion-Engine-Cylinder-Soldering Metal Composition, of which the following is a specification.

The object of my invention is the production of a hard high pressure soldering metal composition having a high melting point and which is adapted to filling sand holes, scores, channels and scratches in and upon the inner surface of cylinder bores of internal combustion engines.

My composition consists of a mixture of tin, antimony, copper and zinc.

In preparing the composition I prefer to use these ingredients in about the following proportions,—viz: tin 79.15%, antimony 7.29%, copper 6.49% and zinc 7.07%.

My soldering metal composition may be applied with a soldering iron or a blow torch to generate the necessary heat to heat the cylinder and soften the metal for welding. My soldering metal if properly applied will stick permanently to the inner cylinder wall under all ordinary conditions of use and wear.

As a result of the heat generated by the combustion of fuel in the water cooled engine cylinder of internal combustion engines, the temperature of the inner cylinder wall under ordinary conditions ranges from about 180 to 350 degrees Fahrenheit. If the engine is allowed to run hot with little or no water to cool it, the temperature of the inner cylinder wall is sometimes raised as high as 600 degrees Fahrenheit, or even higher.

Ordinary solder composed of about ½ tin and ½ lead has been commonly used for filling sand holes, scores, channels and scratches in and upon the inner surface of cylinder bores of internal combustion engines. Block tin has also been used. The melting point of ordinary solder is about 380 degrees Fahrenheit. The melting point of block tin is about 442 degrees Fahrenheit.

Thus, ordinary solder and block tin as soldering metals for this purpose have been found unsatisfactory. These soldering metals are too soft. When the engine becomes so hot that the temperature of the cylinder bore is raised above 380 degrees Fahrenheit, ordinary solder melts and runs like a liquid and when the temperature of the cylinder bore is raised above 442 degrees Fahrenheit, the block tin likewise melts and runs like a liquid. Thus these metals become detached from the inner wall of the cylinder bore under these conditions. This leaves the old hole in the inner surface of the cylinder again and frequently further damage is done to the engine by these detached pieces of soldering metal coming in contact with the rapidly moving piston, within the cylinder.

My soldering metal composition is a heterogeneous mixture. It is a hard, heavy pressure metal, and does not have a melting point like solder or block tin. My soldering metal has what is called a softening or melting range, which is from 480 to 650 degrees Fahrenheit. That is, it just begins to soften at 480 degrees Fahrenheit, but it does not become as a liquid and flow readily until it is heated to at least 650 degrees Fahrenheit. Thus even if the internal combustion engine runs hot, without water, I have found that my metal composition does not melt out or become detached from the cylinder bore like ordinary solder and tin when used for the purpose of filling sand holes, scores, channels and scratches in the cylinder wall.

Experience with my soldering metal used for this purpose shows that it welds more perfectly and that it sticks or adheres more tenaciously to the cylinder wall of the engine cylinder than any other soldering metal known to the trade and used for this purpose.

Ordinary solder shows a Brinell test of 11. Block tin shows a Brinell test of 16. My metal shows a Brinell test of 34 to 36; and when the weld has been made and finished and smoothed off, my metal produces a hard, durable, smooth wearing surface, harmonious with the rest of the inner wall of the cylinder bore of the internal combustion engine.

I claim:

A hard, heavy pressure internal combustion engine cylinder soldering metal composition which is composed of 79.15% tin, 7.29% antimony, 6.49% copper and 7.07% zinc; and which is adapted to fill sand holes, scores, channels, and scratches in cylinders of internal combustion engines.

M ALEXANDER WILLOUGHBY.